US008213876B2

(12) United States Patent
Sankar et al.

(10) Patent No.: US 8,213,876 B2
(45) Date of Patent: Jul. 3, 2012

(54) DIRECT RF DIGITAL TRANSCEIVER AND METHOD

(75) Inventors: Pathamadai V. Sankar, Tustin, CA (US); John J. Hanrahan, Laguna Hills, CA (US); Snehal R. Patel, Fullerton, CA (US); Mahesh C. Reddy, Irvine, CA (US); Ronald A. Webb, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1366 days.

(21) Appl. No.: 11/833,068

(22) Filed: Aug. 2, 2007

(65) Prior Publication Data

US 2009/0036160 A1    Feb. 5, 2009

(51) Int. Cl.
*H04B 1/38*    (2006.01)

(52) U.S. Cl. ............ 455/73; 455/91; 341/120; 341/143; 341/61; 341/155; 375/295; 375/316; 375/350; 375/260; 375/347; 708/313

(58) Field of Classification Search .................... 455/73, 455/82, 91; 341/61, 120, 143, 155; 375/350, 375/232, 260, 347, 316; 708/313
See application file for complete search history.

(56) References Cited

U.S. PATENT DOCUMENTS

| | | | | |
|---|---|---|---|---|
| 5,894,497 A * | 4/1999 | Overton | ......................... | 375/295 |
| 6,647,075 B1 * | 11/2003 | Genrich | .......................... | 375/316 |
| 7,405,682 B2 * | 7/2008 | Ebner et al. | .................... | 341/120 |
| 7,408,494 B2 * | 8/2008 | Mitteregger | ................... | 341/143 |
| 7,439,885 B2 * | 10/2008 | Jensen | ............................. | 341/61 |
| 2006/0034362 A1 * | 2/2006 | Kim et al. | ...................... | 375/232 |
| 2006/0176989 A1 * | 8/2006 | Jensen | ........................... | 375/350 |
| 2009/0037505 A1 * | 2/2009 | Sankar et al. | ................. | 708/313 |

OTHER PUBLICATIONS de Boor, Carl. Applied Mathematical Sciences, "A Practical Guide to Splines," Springer-Verlag, New York, pp. 129-135.
Colley, James W. and Tuckey, John W. "An Algorithm for the Machine Calculation of Complex Fourier Series," Mathematics of Computation, vol. 19, No. 90, Apr. 1965, pp. 297-301.
McClellan, James H. and Parks, Thomas W. "A Unified Approach to the Design of Optimum FIR Linear-Phase Digital Filters," IEEE Transactions on Circuit Theory, vol. CT-20, Nov. 1973, pp. 697-701.
Neuvo, Yrjo, Cheng-Yu, Dong and Mitra, Sanjit K. "Interpolated Finite Impulse Response Filters," IEEE Transactions on Acoustics, Speech and Signal Processing, vol. ASSP-32, Jun. 1984, pp. 563-570.
Bryan, Nicholas J. "Interpolated Finite Impulse Response Filters: Improvements on Design Case Study," Digital Signal Processing, Oct. 2006, 8 pages.

(Continued)

*Primary Examiner* — April G Gonzales
(74) *Attorney, Agent, or Firm* — Harness, Dickey & Pierce, P.L.C.

(57) ABSTRACT

A direct digital radio having a high speed RF front end in communication with an antenna, and a radio subsystem that can be configured to form a multi-channel, full duplex transceiver system. The high speed RF front end provides a digital signal to the radio subsystem. Each transceiver includes a waveform processing subsystem that makes use of a linear, phase-B cubic spline interpolating finite impulse response (IFIR) filter for filtering the received RF signal substantially entirely in the digital domain. The linear phase-B, cubic spline IFIR filter requires significantly fewer hardware components than traditional FIR filters and is ideally suited for implementation using Very Large Scale Integration (VLSI) technology.

19 Claims, 8 Drawing Sheets

OTHER PUBLICATIONS

Bada, A. M. and Maddiotto, M. "Design and Realisation of Digital Radio Transceiver Using Software Radio Architecture," IEEE VTC 2000, pp. 1727-1731.

Daneshgaran, Fred and Laddomada, Massimiliano. "Transceiver Front-End Technology for Software Radio Implementation of Wideband Satellite Communication Systems," Kluwer Academic Press, 2002, pp. 1-29.

Pang, D., Ferrari, L.A. and Sankar, P.V. "A Unified Approach to General IFIR Filter Design Using B-Spline Functions," Maple Press 1989, pp. 228-232.

Juszkiewicz, Richard S. "An Analysis of Interpolated Finite Impulse Response Filters and Their Improvements," EEN 536—Case Study I, Nov. 2005, pp. 1-6.

Xilinx, Distributed Arithmetic FIR Filter v9.0, DS240 Apr. 28, 2005, pp. 1-45.

Agatep, Antolin. Xilinx, Xilinx Spartan-II FIR Filter Solution, WP116 (v1.0) Apr. 5, 2000, pp. 1-20.

Hwang, Sun-Young, Choi, Jong-Kwan and Kim, Sik. "Design of an Area-Efficient Interpolated FIR Filter Based on LUT Partitioning," 11 pages.

Ferrari, Leonard A. and Sankar, P. V. "Minimum Complexity FIR Filters and Sparse Systolic Arrays," IEEE Transactions on Computers, vol. 37, No. 6, Jun. 1988, pp. 760-764.

Rayavarapu, Neela R. and Prakash, Neelam Rup. "A Computationally Efficient Design for Protoype Filters of an M-Channel Cosine Modulated Filter Bank," Transactions on Engineering, Computing and Technology, vol. 13, May 2006, ISSN 1305-5313, pp. 272-274.

Vainio, Olli. "An Approach to Least-Squares Design of Interpolated FIR Filters," EEN536 Digital Signal Processing, Oct. 18, 2006, 4 pages.

Tamura, Fumihiko et. al. "Digital RF Feedforward Systems for Beam Loading Compensation in JKJ Synchrotrons,"EPAC 2002, Paris, France, pp. 2106-2109.

Computer Aided Design of FIR Filters, 22 pages.

Vaidyanathan, P.P. "Efficient and Multiplierless Design of FIR Filters with Very Sharp Cutoff via Maximally Flat Building Blocks," IEEE Transactions on Circuits and Systems, vol. CAS-32, No. 3, Mar. 1985, pp. 236-244.

McClellan, James H. and Parks, Thomas W. "A Personal History of the Parks-McClellan Algorithm," IEEE Signal processing Magazine, Mar. 2005, pp. 82-86.

http://en.wikipedia.org/wiki/De_Boor's_algorithm, printed Jan. 14, 2008, 2 pages.

\* cited by examiner

M IS THE COARSE TO FINE SAMPLING RATIO OF THE IFIR FILTER

M IS THE COARSE TO FINE SAMPLING RATIO OF THE IFIR FILTER

| TYPE OF SPLINE | GENERALIZED CUBIC SPLINE BASIS FUNCTION (LOWPASS FILTER) | DERIVATIVE IMPULSES (FOURTH DERIVATIVE) |
|---|---|---|
| (1-4-1) CUBIC B-SPLINE | $q_0(u) = u^3$<br>$q_1(u) = 1 + 3u + 3u^2 - 3u^3$<br>$q_2(u) = 4 - 6u^2 + 3u^3$<br>$q_3(u) = 1 - 3u + 3u^2 - u^3$ | $[(1/6) - (4/6)\ 1 - (4/6)\ (1/6)]$ |
| (2-5-2) CUBIC SPLINE | $q_0(u) = (9/8)u^2 - (1/8)u^3$<br>$q_1(u) = 1 + (15/8)u + (3/4)u^2 - (9/8)u^3$<br>$q_2(u) = (10/4) - (21/8)u^2 + (9/8)u^3$<br>$q_3(u) = 1 - (15/8)u + (3/4)u^2 + (1/8)u^3$ | $[-(1/8) - 1(18/8) - 1 - (1/8)]$ |
| (1-2-1) CUBIC SPLINE | $q_0(u) = (3/2)u^2 - (1/2)u^3$<br>$q_1(u) = 1 + (3/2)u - (1/2)u^3$<br>$q_2(u) = 2 - (3/2)u^2 + (1/2)u^3$<br>$q_3(u) = 1 - (3/2)u + (1/2)u^3$ | $[-(1/2)\ 0\ 1\ 0 - (1/2)]$ |

Figure 8

| DETAILS | OPTIMAL FIR FILTER | LINEAR PHASE 1-4-1 CUBIC SPLINE IFIR FILTER |
|---|---|---|
| PASS BAND | 0-30 M Hz | 0-30 M Hz |
| TRANSITION BAND | 30-100 M Hz | 30-100 M Hz |
| STOP BAND | 100 M Hz-2 G Hz | 100 M Hz-2 G Hz |
| PASS BAND ERROR | -49.64 dB | -45.98 dB |
| STOP BAND ERROR | -57.71 dB | -52.52 dB |
| NUMBER OF FILTER TAPS | 197 | 197 |
| NUMBER OF MULTIPLIERS | 98 | 21 |
| NUMBER OF DELAY ELEMENTS | 196 | 216 |
| NUMBER OF ADDERS | 196 | 29 |

Figure 10

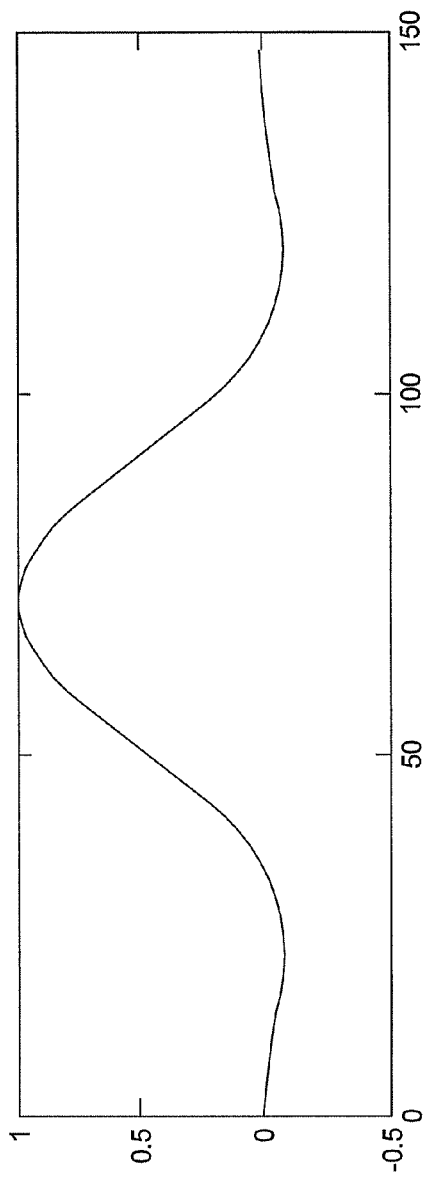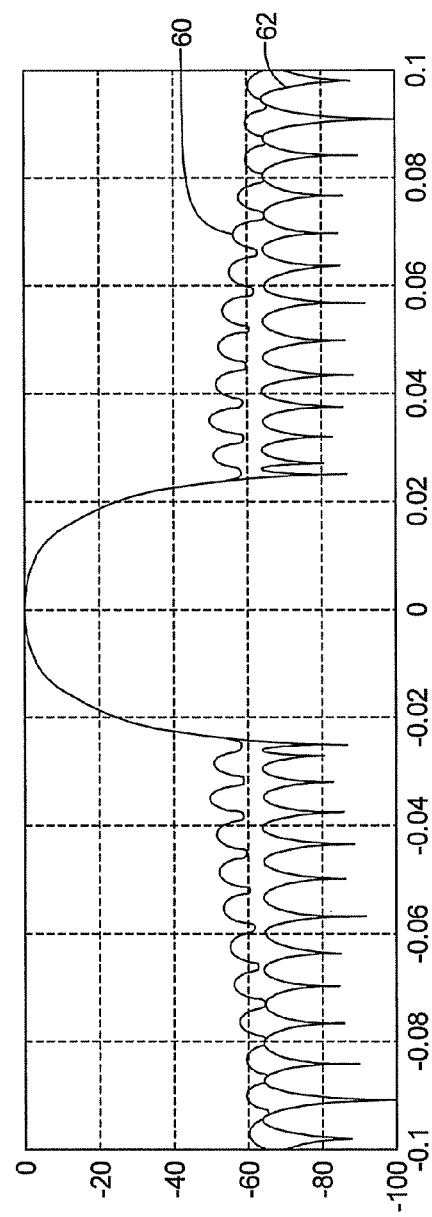

DIRECT RF DIGITAL TRANSCEIVER AND METHOD

CROSS-REFERENCE TO RELATED APPLICATIONS

This application is related in general subject matter to concurrently filed U.S. patent application Ser. No. 11/833,039, filed Aug. 2, 2007, which is incorporated by reference in the present application.

FIELD

The present disclosure relates to RF transceivers, and more particularly to a digital RF transceiver that is able to obtain a digital representation of a received analog RF input signal and perform substantially all waveform processing of the received signal in the digital domain.

BACKGROUND

At present, Software Defined Radio (SDR) technology is expected to significantly improve the way network centric operations are handled, as well as enhance the operation or implementation of a wide variety of equipment and systems that make use of radio frequency (RF) signals.

One of the key enablers of SDR technology is the extent to which an SDR device can be made to be fully digital in its operation. Presently, RF signals are typically received at the antenna of an RF transceiver, and then down-converted to an intermediate frequency before processing of the RF signal in the digital domain can be accomplished. This adds significant cost and complexity to the transceiver. However, the use of analog circuitry at the RF front end of a RF transceiver cannot be entirely eliminated due to the analog nature of electromagnetic radiation.

Present attempts at digital transceivers have required such transceivers to incorporate a relatively large number of adders, multipliers and other components to perform the needed waveform processing. Such construction has contributed to the relatively high cost of digital RF transceivers.

Thus, there is a high level of interest in producing a digital RF transceiver that is of simpler and more cost effective construction than presently available digital RF transceivers, and that is ideally suited for use with SDR technology. The reduction in cost of a digital RF transceiver, and the reduction in the physical size of such a transceiver, would significantly help to expand the potential applications and uses of such a transceiver.

SUMMARY

A direct digital device and method of forming a direct digital device for use with an RF antenna. In one embodiment the device includes a high speed RF front end adapted to convert an analog signal received at the antenna into a digital input signal. A digital subsystem incorporating a finite impulse response (FIR) filter is used for high speed digital waveform processing substantially entirely in a digital domain.

In one exemplary embodiment the direct digital device forms a direct digital radio. In one specific embodiment a full duplex, direct digital radio is disclosed.

In another exemplary embodiment the device incorporates an interpolating, linear phase-B cubic spline filter for waveform processing. The cubic spline filter requires significantly fewer component parts to perform digital waveform processing, and forms a significantly less expensive subsystem of the device, thus enabling a lower cost device to be formed.

In another embodiment a direct digital radio is disclosed that incorporates a plurality of digital transceivers tuned to different frequencies.

In still another implementation, a method for forming a direct digital radio is disclosed. The method involves using a high speed RF front end adapted to digitize an RF signal received at said antenna, and to convert a digital signal generated by said direct digital radio into a corresponding analog signal able to be radiated by said antenna. A finite impulse response (FIR) filter in communication with said antenna is used for high speed digital waveform processing substantially entirely in a digital domain. This embodiment does not require any down-converting of a received RF signal to an intermediate signal before digitally processing the received RF signal.

In various embodiments and implementations, the FIR filter comprises one of either a 1-4-1, 2-5-2 or 1-2-1 interpolating, linear phase-B cubic spline filter.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 8 is a chart illustrating characteristics of the pre-filters shown in FIGS. 5, 6 and 7;

FIG. 10 is a chart illustrating the reduction in the number of multipliers and adders for a waveform processing subsystem incorporating the cubic spline IFIR filter of the present disclosure;

FIG. 11A is a sample input waveform prior to be filtered by the cubic spline IFIR filter of the present disclosure;

FIG. 11B shows the filtered output from an optimal, conventional FIR filter, and from a cubic spline IFIR filter in accordance with the present disclosure.

DETAILED DESCRIPTION

The following description is merely exemplary in nature and is not intended to limit the present disclosure, application, or uses.

Figure 1:
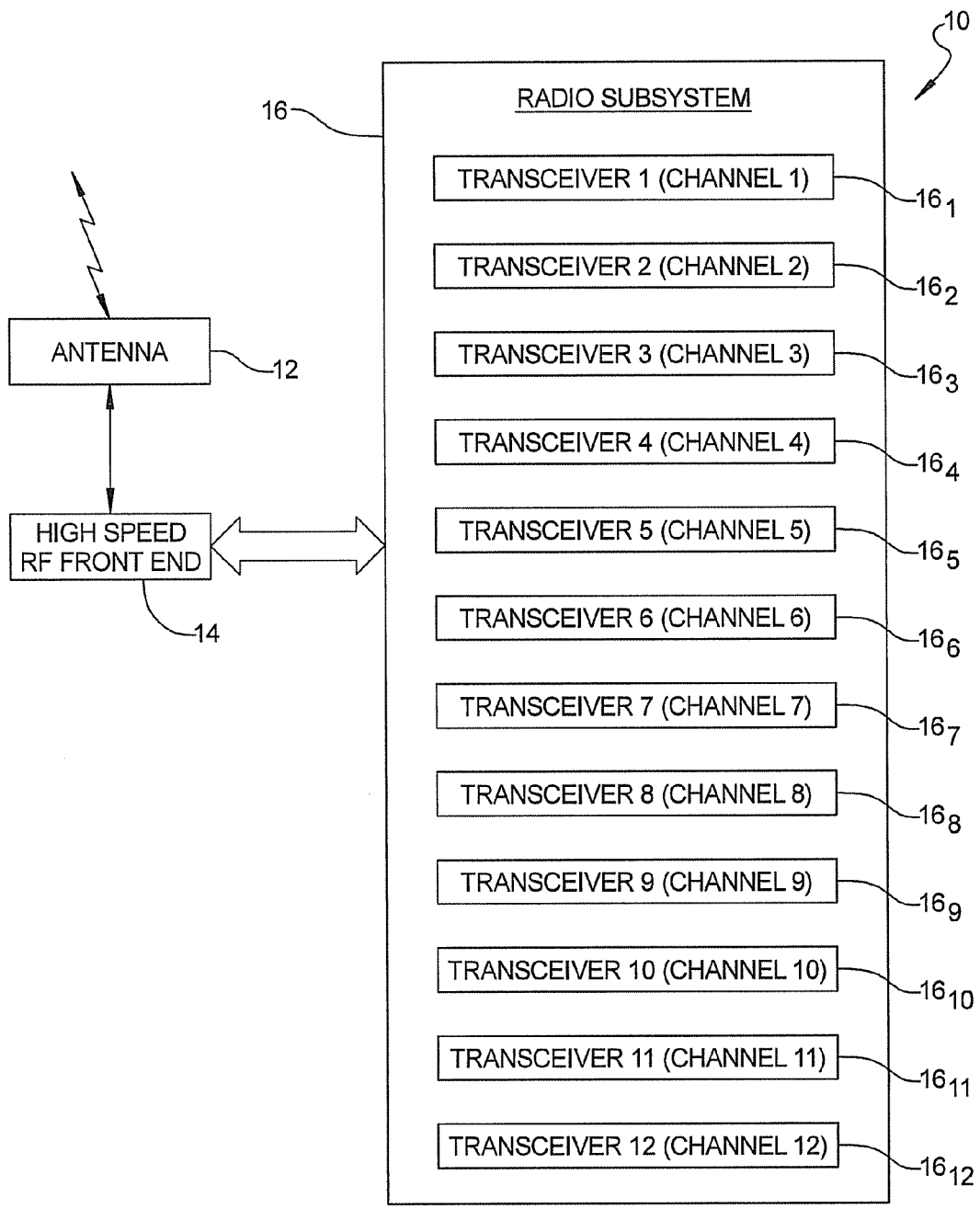
FIG. 1 is a block diagram of a direct digital radio in accordance with one embodiment of the present disclosure.

Referring to FIG. 1, there is shown one exemplary embodiment of a direct digital radio (i.e., transceiver) 10 in accordance with the present disclosure. The direct digital radio (hereinafter the "digital radio") 10 in this example includes an antenna 12 in communication with a high speed RF front end 14. The RF front end 14 is in communication with a multi-channel radio subsystem 16. The radio subsystem 16 in this example has 12 independent but identical RF transceiver subsystems $16_1$-$16_{12}$ that form 12 independent channels tuned to different frequency bands. It will be appreciated immediately, however, that the present disclosure is not limited to only a multi-channel, direct digital radio, but a single channel direct digital radio could just as readily be formed using the teachings presented herein. Also, the frequency ranges shown in FIG. 1 are merely exemplary, and other frequency ranges could be implemented to suit specific applications. It is anticipated that in many applications, the ability to use the digital radio 10 to communicate over a plurality of independent RF channels will be a highly desirable feature. As will be explained further in the following paragraphs, due to the reduction in the total number of component parts required for the waveform processing section of the digital radio 10, the cost savings that may be realized through the construction of the digital radio 10 increases as the number of channels implemented increases.

Referring further to FIG. 1, the high speed RF front end 14 makes use of a Sigma/Delta analog-to-digital converter ("ADC") and digital-to-analog converter ("DAC"). A suitable Sigma/Delta ADC and DAC front end subsystem is commercially available from a number of sources, for example companies such as Terecelo Inc., of Sherman Oaks, Calif. (formerly Techno Concepts Inc.); Hughes Research Laboratories of Malibu, Calif.; GE Fanuc Embedded Systems of Charlottesville, Va. The RF front end preferably provides sampling at rates between about 6-10 GHz, with spurious free dynamic range in excess of 100 dB in the 2-4 MHz frequency range. Thus, when receiving analog RF signals, the high speed ADC operation of the RF front end 14 is able to digitize the RF signals and provide a corresponding digital signal to the radio subsystem 16. Conversely, the RF front end 14 is able to receive a high frequency digital signal and convert it to a corresponding analog signal for transmission by the antenna 12 using its high speed ADC. The use of the high speed RF front end eliminates the need to down-convert received RF signals received by the antenna 12 to an intermediate frequency before further waveform processing can be performed by the radio subsystem 16. Thus, the output of the RF front end 14 can be processed substantially entirely in the digital domain.

Figure 2:
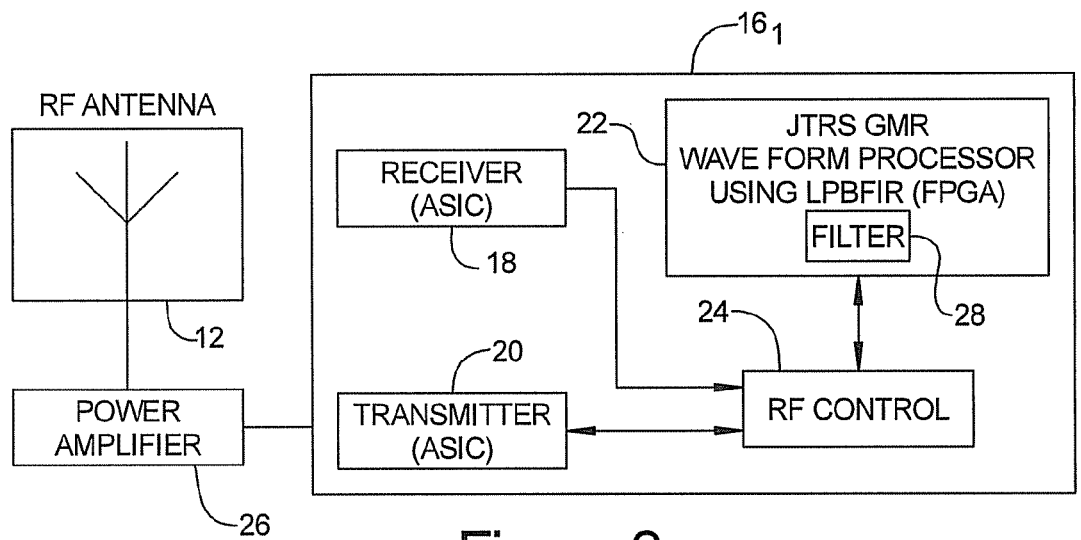
FIG. 2 is a block diagram of one exemplary transceiver configuration in accordance with the present disclosure.

Referring to FIG. 2, one exemplary RF transceiver subsystem $16_1$ is illustrated in greater detail. The RF transceiver subsystem $16_1$ includes a receiver 18, a transmitter 20, a waveform processor subsystem 22 and an RF control subsystem 24. A power amplifier 26 may be used to amplify signals communicated between the transceiver $16_1$ and the antenna 12.

Both the receiver 18 and the transmitter 20 may be provided in application specific integrated circuits (ASICs). The waveform processor subsystem 22 includes a filter 28 which in one form may comprise a finite impulse response (FIR) filter. In another embodiment the filter 28 may comprise an interpolating, linear phase-B cubic spline filter, preferably of the 1-4-1, 2-5-2 or 1-2-1 configurations. Essentially, the filter 28 is used to digitally filter the sampled waveform, in this example a waveform having a frequency between about 30-65 MHz (corresponding to channel "1" in the radio subsystem 16 of FIG. 1). The filter 28 may be used as a pass band filter or a low pass filter, depending on the specific construction of the waveform processor subsystem 22, as will be discussed further below. The RF control subsystem 24 is used to interface the receiver 18 and the transmitter 20 to the waveform processor subsystem 24. The RF control 24 provides circuitry for the appropriate channeling of the digitized input RF waveform to the appropriate bandpass filter for the selection of the desired frequency range.

Filter Construction

As explained above, a significant feature of the digital radio 10 is the filter 28. When the filter 28 is formed as an interpolating, linear phase-B cubic spline filter, then it will be appreciated that the filter 28 may be used for a wide range of band pass or low pass filtering tasks in a wide variety of signal processing applications. Thus, it will be appreciated that the filter 28 is not limited to use only in digital radios, but may be used in other types of digital electronic devices where high speed filtering in the digital domain is required. For the following discussion, it will be assumed that the embodiment of the filter 28 being discussed is that of the cubic B-spline, interpolating finite impulse response (IFIR) type (which also may be equivalently expressed as an "interpolating, linear phase-B cubic spline filter).

Figure 3:
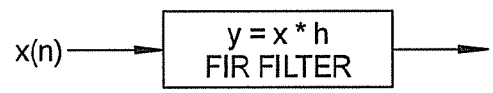
FIG. 3 is a block diagram of a conventional finite impulse response (FIR) filter that may be used with the system and method of the present disclosure to perform high speed digital waveform processing.

Referring briefly to FIG. 3, a conventional FIR filter is shown. It may be assumed that the input signal "x" has "n" samples, that the fitter "h" has "p" coefficients and the resultant signal has "N+p−1" samples. This implementation, which is a convolution of "x" with "h" requires p minus 1 delay elements, p adders and p multipliers. Essentially, this configuration of FIR filter is configured with the principal goal of minimizing pass band and stop band errors. However, it does not provide an optimal design from the design objective standpoint of minimizing the number of individual hardware elements, and thus it is not especially well suited for VLSI (very large scale integration). An optimal design of filter for VLSI implementation is one that minimizes the number of independent hardware component elements, while still providing acceptable pass band and stop band performance. The fewer independent hardware components needed for the filter, the less costly and the smaller the VLSI circuit can be manufactured.

Figure 4:
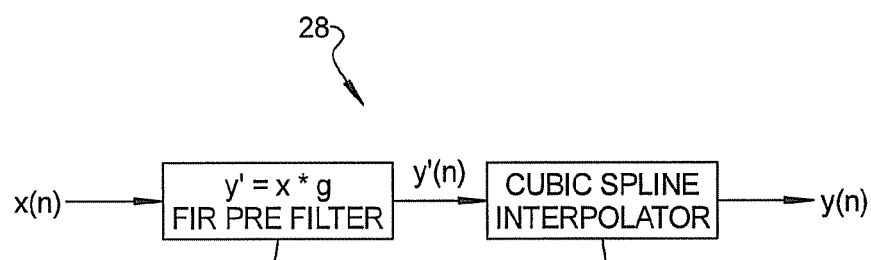
FIG. 4 is a block diagram of an interpolated FIR filter that may be used with the system and method of the present disclosure.

A first embodiment of the cubic B-spline IFIR filter 28, which is substantially equivalent in function to the FIR filter of FIG. 3, is shown in FIG. 4. In this configuration the cubic B-spline IFIR filter 28 is acting as a low pass filter. A FIR pre-filter 30 is used to generate an output Y'(n) from an input X(n), and the output Y(n) is fed into a cubic spline interpolator 32. The coarse sampled FIR pre-filter "g" is defined as g(n)= h(n), where n=kM, where k=1 ... p/M, and is zero elsewhere, and "M" is the ratio of the number of non-zero samples in h to g. Hence, the implementation of the FIR pre-filter 30 using g requires (p−1) delay elements, (p/M) adders and (p/M) multipliers. However, the FIR pre-filter 30 can be implemented with only at most 8 delay elements, 4 adders and 4 shift registers. Accordingly, the cubic B-spline IFIR filter 28 can be implemented with significantly fewer hardware component elements.

Figure 5:
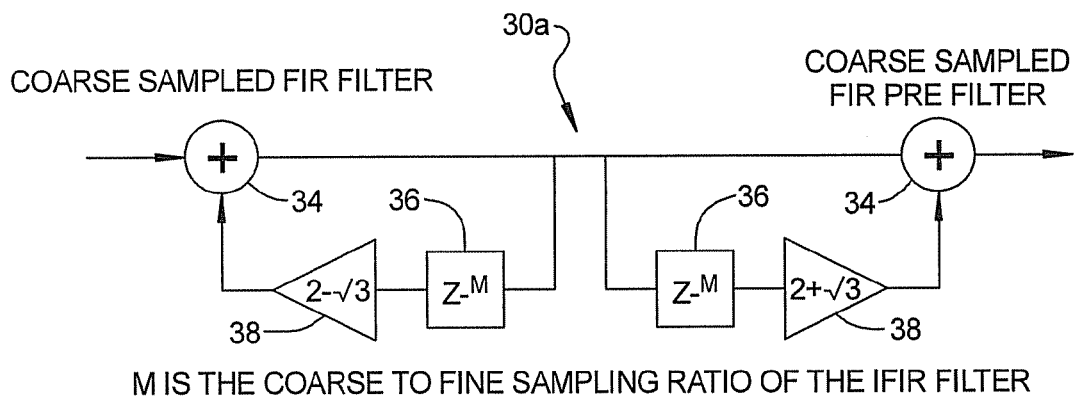
FIG. 5 is a block diagram of a 1-4-1 cubic spline pre-filter that may form a portion of the waveform processing subsystem of one embodiment of the direct digital radio and method of the present disclosure.

Referring to FIG. 5, one specific implementation of pre-filter (inverse) for implementing the 1-4-1 spline is shown and designated by reference numeral 30a. Two adders 34, two delay elements 36 and two multipliers 38 are used. In this example, "M" is the coarse-to-fine sampling ratio of the cubic B-spline IFIR filter 28, and the gain factors for the multipliers 38 are $(2-\sqrt{3})$ and $(2+\sqrt{3})$. The symbol "$z^{-M}$" stands for "M" delay elements. The pre-filter is called the "inverse filter" since it computes the appropriate coefficients (i.e., a new set of coefficients at locations kM, k=1, ..., p/M) such that in the coarse sampled domain the effect of applying the pre-filter followed by the post-filter, does not affect the values of g. However, when the pre-filter is applied to g and then the post-filter is applied to y' at the fine sampling rate, it truly interpolates the signal, however retaining the original coefficients of g at the samples kM for k=1, . . . , p/M. This is in essence the meaning of "interpolation".

Figure 6:
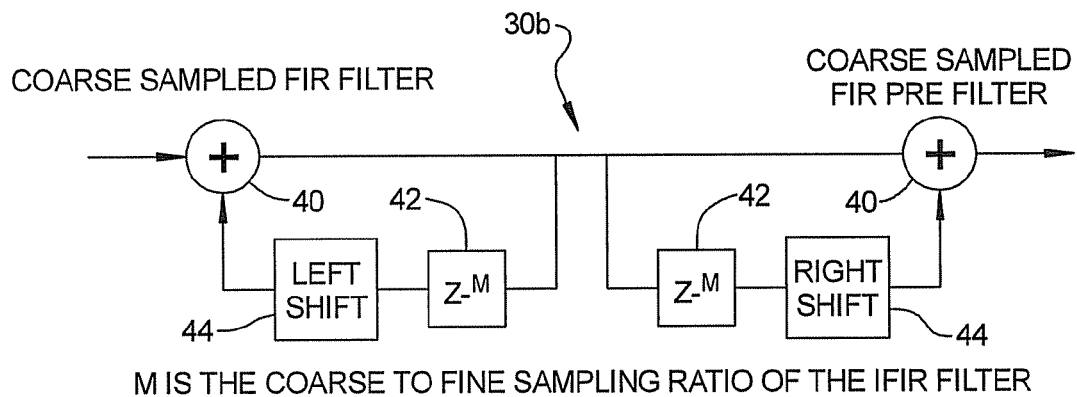
FIG. 6 is a block diagram of a 2-5-2 cubic spline pre-filter.

FIG. 6 illustrates an implementation of a pre-filter (inverse) 30b for implementing the 2-5-2 spline. This implementation of the pre-filter makes use of just two adders 40, two delay elements 42, and the gain factors are just left and right shifts 44a and 44b. As mentioned earlier herein, this pre-filter computes a new set of coefficients corresponding to the coarse sampled values at locations kM, k=1, . . . p/M in order to facilitate interpolation in a later performed operation. Again, in this example, "M" is the coarse-to-fine sampling ratio of the cubic B-spline IFIR filter 28.

Figure 7:
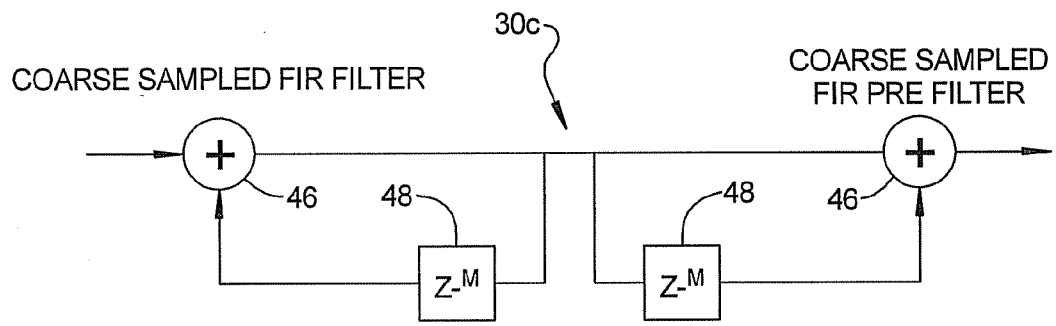
FIG. 7 is a block diagram of a 1-2-1 cubic spline pre-filter.

FIG. 7 illustrate an implementation of a pre-filter (inverse) 30c for implementing the 1-2-1 spline. Note that only two adders 46 and only two delay elements 48 are required. No gain factors are required. The properties of the 1-4-1, 2-5-2 and 1-2-1 cubic B-splines are also summarized in the table of FIG. 8.

Figure 9:
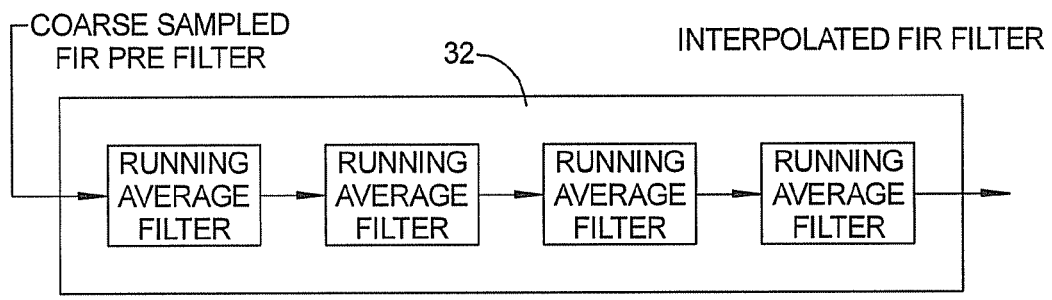
FIG. 9 a block diagram of an interpolating post-filter illustrated in FIG. 4.

Referring to FIG. 9, one embodiment of the interpolation post-filter 32 is shown. In this example, a cascade of four running average filters 50 is used for each of the three cubic B-spline IFIR filter implementations described above in FIGS. 5-7. The running average filter is basically a low pass filter and hence is useful for interpolation. A cubic spline interpolator is obtained with the use of four cascaded running average filters Thus, the pre-filters 30a, 30b and 30c for implementing the various cubic splines, as shown in FIGS. 5-7 respectively, are all easily implemented from a hardware design/construction standpoint, making them ideally suited to implementation via VLSI technology. When implementing the linear phase-B cubic spline IFIR filter 28 with a 1-4-1 spline in a wide band low pass filter, a very significant reduction in the number of multipliers and adders is realized, as indicated in the exemplary comparison table of FIG. 10. Similar component reductions can be realized for the 2-5-2 spline and 1-2-1 spline implementations. A comparison between the conventional optimal FIR filter and the cubic B-spline IFIR filter 28 incorporating the 1-4-1 cubic spline as described herein (in connection with FIG. 5) is illustrated in FIG. 11b, with an exemplary input waveform to the cubic B-spline IFIR filter 28 being shown in FIG. 11a. In FIG. 11b, the response of the 1-4-1 cubic spline is denoted by reference number 60, while the response from a conventional FIR filter is denoted by reference number 62. It will be noted that the response of the cubic B-spline IFIR filter 28 incorporating the 1-4-1 cubic spline pre-filter 30a closely approximates the response achieved via the conventional, optimal FIR filter (shown in FIG. 3). However, as noted above, the cubic B-spline IFIR filter 28 achieves this with a filter design having significantly few hardware adders and multipliers.

IFIR Design Process

Figure 12:
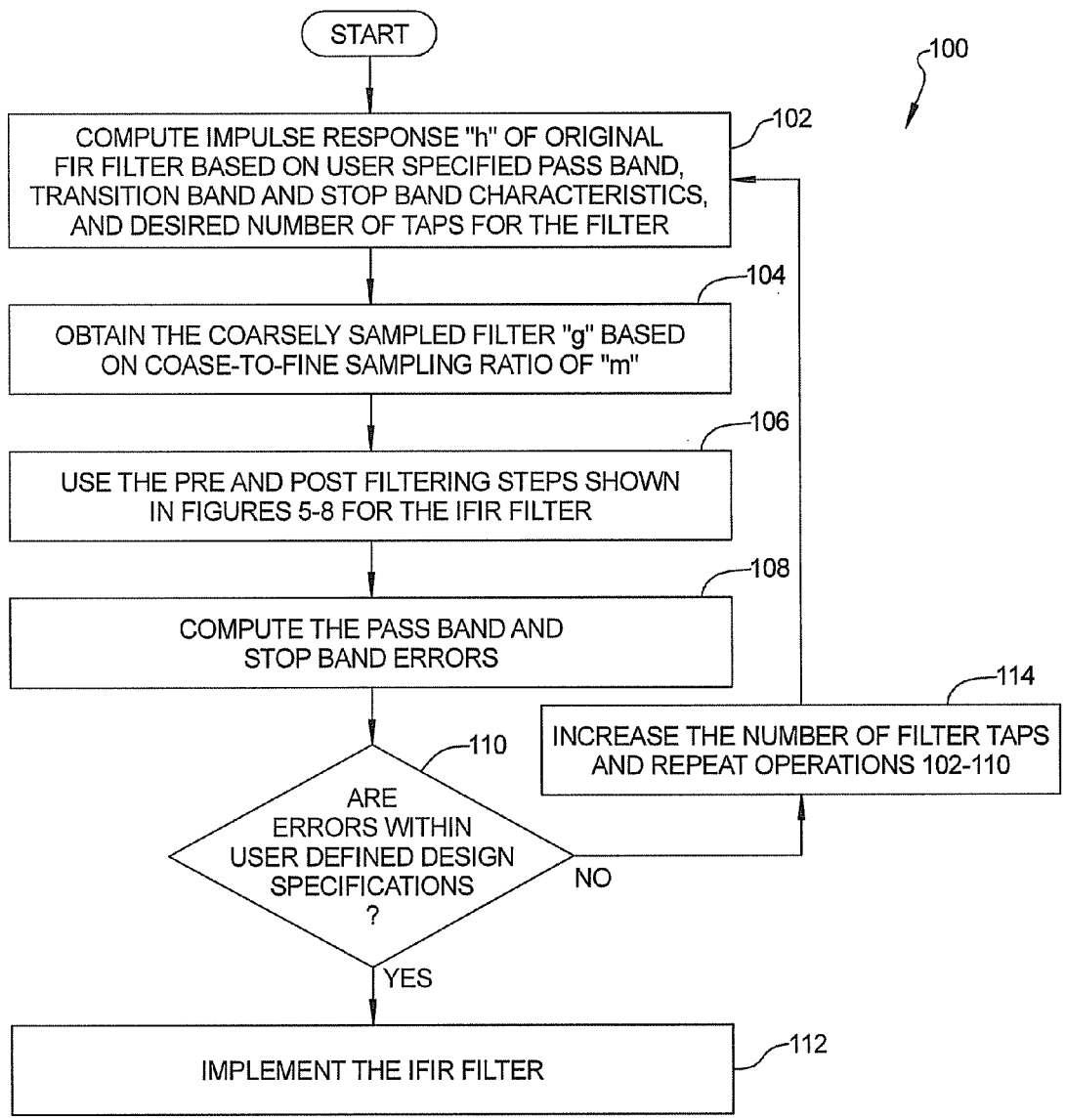
FIG. 12 is a flowchart setting forth a plurality of exemplary operations in designing a suitable cubic spline IFIR filter in accordance with the present disclosure.

The IFIR design process is summarized in the flowchart 100 of FIG. 12. At operation 102, the impulse response "h" of the original FIR filter is computed using the standard McClellan, Parks algorithm (see J. H. McClellan and T. W. Parks, "A Unified Approach To The Design Of Optimum FIR Linear Phase Digital Filters," IEEE Transactions on Circuit Theory, Vol. CT-20, November 1973, hereby incorporated by reference into the present application). The calculation is based on the user specified pass band, transition band and stop band characteristics as well as the desired number of taps for the filter.

At operation 104, obtain the coarsely sampled filter "g" based on the coarse-to-fine sampling ratio of "M". At operation 106 perform the pre-filtering operations described in connection with any one of the pre-filters of FIGS. 5, 6 and 7, along with the post-filtering operation described in connection with FIG. 9. At operation 108, compute the pass band and stop band errors. At operation 110, check whether the pass band and stop band errors are within predefined design specifications to determine if satisfactory filter performance has been achieved. If the answer is "Yes", proceed to implement the cubic B-spline IFIR filter in a suitable component, for example in a field programmable gate array (FPGA), as indicated at operation 112. If the errors are not within the predetermined specification, increase the number of filter taps and repeat operations 102-110 as indicated at operation 114 until a satisfactory filter design is achieved (i.e., one with stop band and pass band errors within acceptable limits).

Band Pass Filtering

From the foregoing discussion, it will be appreciated that once the configuration of a low pass IFIR filter having the desired filter characteristics is determined, then a band pass filter may be readily constructed. A band pass filter may be implemented by modulating the cubic B-spline IFIR filter 28 impulse response with the appropriate sign changes (i.e., plus or minus) reflecting the frequency of the carrier wave of the input waveform being fed into the cubic B-spline IFIR filter 28. However, in an application involving a software defined radio (SDR), since it will eventually be desired to demodulate the received RF signal (i.e. waveform) by bringing it to the base band, a more desirable approach will be to first decimate the received band pass signal. Then one can apply an appropriate IFIR filter to recover the base band signal. From FIG. 11b, the decimation process creates multiple copies of the spectrum of the original band pass signal due to the periodic nature of the sampling and the underlying Fast Fourier Transform (FFT) concepts that are used in the decimation process. The multiple copies of the spectrum of the original band pass signal include a copy at either the base band (if the carrier frequency happens to be an integral multiple of the sampling rate) or very near to it. This provides a highly advantageous side effect of down sampling that eliminates the need for special circuitry to down shift the signal by using complex demodulation schemes. Rather, the signal can be demodulated simply by applying an efficient low pass or band pass filter on or near the base band. Thus, the description relating to the cubic B-spline IFIR low pass filter 28 applies equally to band pass filtering as well.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A direct digital radio frequency (RF) device adapted for use with an RF antenna, the device comprising:
    a high speed RF front end adapted to convert an analog signal received at said antenna into a digital input signal without first down converting the received analog signal;
    a digital subsystem for receiving the digital input signal, the digital subsystem incorporating a finite impulse response (FIR) filter for high speed digital waveform processing of the digital input signal substantially entirely in a digital domain; and wherein said FIR comprises an interpolating, linear phase-B spline filter.

2. The device of claim 1, wherein said device forms a full duplex transceiver, and wherein said high speed front end includes a digital-to-analog converter for converting a digital output signal generated by said digital subsystem, into an analog signal for application to said antenna.

3. The device of claim 1, wherein said digital subsystem comprises a plurality of independent digital receiver sections tuned to a corresponding plurality of different frequencies.

4. The device of claim 1, wherein said device comprises a digital transceiver, and wherein said digital transceiver comprises:
   a receiver;
   a transceiver;
   an RF control subsystem in communication with said receiver and said transceiver; and
   a waveform processor subsystem incorporating said FIR.

5. The device of claim 1, wherein said device comprises a transceiver, and wherein said high speed RF front end comprises a high speed Delta-Sigma analog-to-digital converter and digital-to-analog converter.

6. The device of claim 1, wherein said interpolating, linear phase-B spline filter comprises an interpolating, linear phase-B cubic spline filter.

7. The device of claim 1, wherein said interpolating linear phase-B cubic spline filter comprises one of:
   a 1-4-1 linear phase-B cubic spline filter;
   a 2-5-2 linear phase-B cubic spline filter; and
   a 1-2-1 linear phase-B cubic spline filter.

8. A direct digital radio frequency (RF) transceiver comprising:
   an RF antenna;
   a high speed RF front end adapted to convert an analog electromagnetic wave signal received at said antenna into a digital input signal without first down converting the received analog electromagnetic wave signal, and a digital signal applied to said antenna into an analog electromagnetic wave signal;
   a digital transceiver subsystem for receiving the converted analog electromagnetic wave signal, the digital transceiver subsystem incorporating a finite impulse response (FIR) filter for high speed digital waveform processing of the converted analog electromagnetic wave signal substantially entirely in a digital domain; and
   wherein said FIR filter comprises an interpolating, linear phase-B cubic spline filter.

9. The transceiver of claim 8, wherein said transceiver forms a full duplex transceiver.

10. The transceiver of claim 8, wherein said digital subsystem comprises a plurality of independent digital receiver sections tuned to a corresponding plurality of different frequencies.

11. The transceiver of claim 8, wherein said digital transceiver subsystem comprises:
    a receiver;
    a transceiver;
    an RF control subsystem in communication with said receiver and said transceiver;
    a waveform processor subsystem incorporating said FIR, and wherein said FIR comprises an interpolating cubic spline filter.

12. The transceiver of claim 8, wherein said FIR filter comprises an interpolating, linear phase-B cubic spline filter.

13. The transceiver of claim 12, wherein said interpolating linear phase-B cubic spline filter comprises one of:
    a 1-4-1 linear phase-B cubic spline filter;
    a 2-5-2 linear phase-B cubic spline filter; and
    a 1-2-1 linear phase-B cubic spline filter.

14. The transceiver of claim 8, wherein said high speed RF front end comprises a high speed Delta-Sigma analog-to-digital converter and digital-to-analog converter.

15. A method of forming a direct digital radio adapted to receive a radio frequency (RF) signal, comprising:
    using a high speed RF front end adapted to digitize an RF signal received at an antenna, without first down converting the RF signal, and to convert a digital signal generated by said direct digital radio into a corresponding analog signal able to be radiated by said antenna;
    using a finite impulse response (FIR) filter in communication with said antenna for high speed digital waveform processing the digitized RF signal substantially entirely in a digital domain; and
    wherein said using a FIR filter includes using an interpolating, linear phase-B cubic spline filter.

16. The method of claim 15, wherein using a high speed RF front end comprises using a high speed RF front end incorporation a delta-sigma analog-to-digital and digital-to-analog converter.

17. The method of claim 15, wherein forming a direct digital radio comprises forming a full duplex, direct digital radio.

18. The method of claim 15, wherein forming a direct digital radio comprises forming a plurality of independent digital receiver sections tuned to a corresponding plurality of different frequencies.

19. The method of claim 15, wherein said using an interpolating, linear phase-B cubic spline filter comprises using one of:
    a 1-4-1 linear phase-B cubic spline filter;
    a 2-5-2 linear phase-B cubic spline filter; and
    a 1-2-1 linear phase-B cubic spline filter.

* * * * *